March 26, 1935.  W. S. GURTON ET AL  1,995,920
COMPENSATING DRAFT COUPLING FOR TRACTORS AND TRAILERS
Filed Oct. 21, 1933
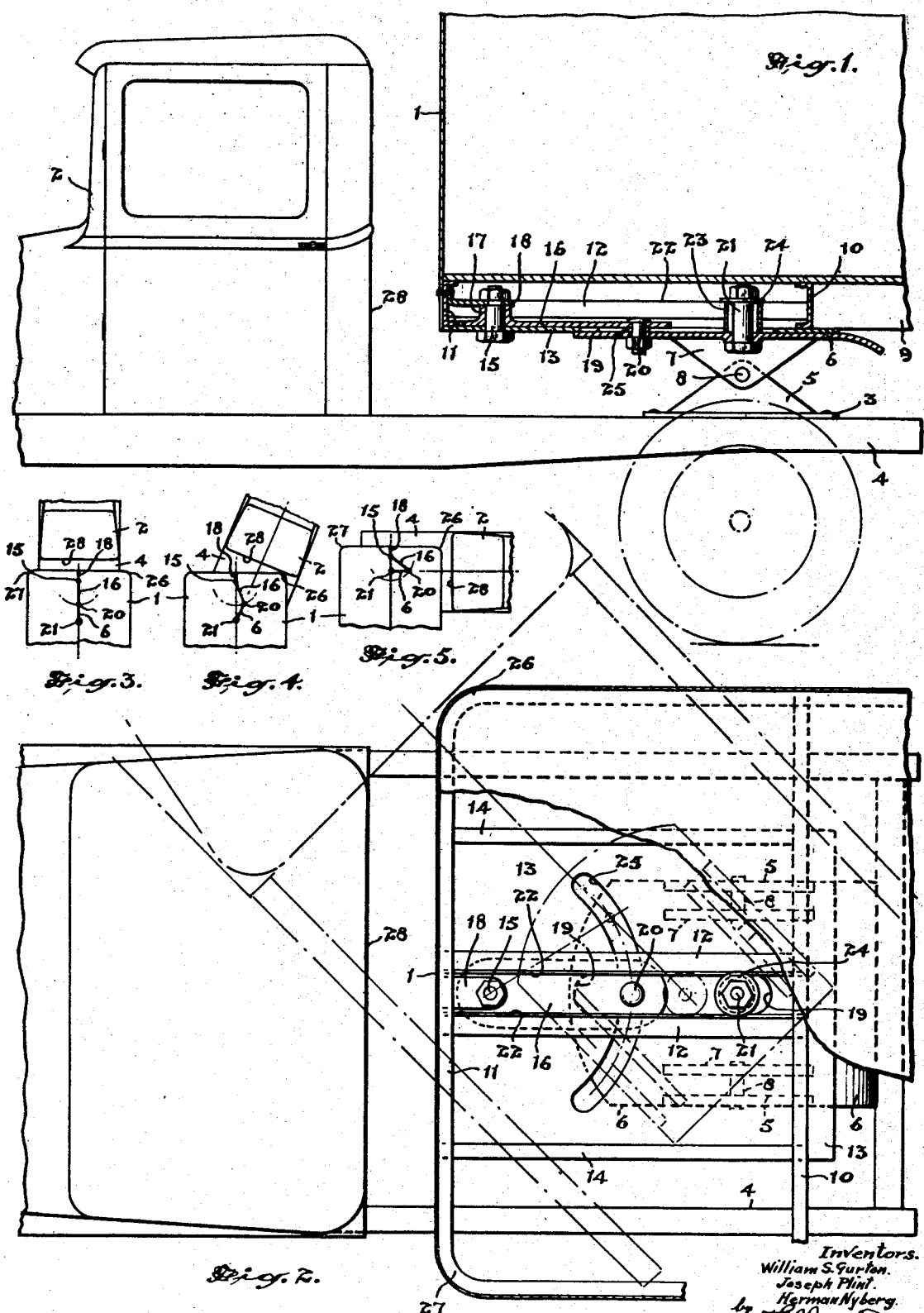
Inventors.
William S. Gurton.
Joseph Plint.
Herman Nyberg.

Patented Mar. 26, 1935

1,995,920

UNITED STATES PATENT OFFICE 1,995,920

COMPENSATING DRAFT COUPLING FOR TRACTORS AND TRAILERS

William S. Gurton, Joseph Plint, and Herman Nyberg, Kitchener, Ontario, Canada, assignors to Dominion Truck Equipment Co. Limited, Kitchener, Ontario, Canada Application October 21, 1933, Serial No. 694,664

7 Claims. (Cl. 280—33.1)

The principal objects of this invention are to enable the close-coupling of tractor and trailer units and thereby effectively increase the carrying capacity in relation to the over-all length of the tractor-trailer combination, and to effect a material reduction in the wind resistance encountered thereby.

The principal feature of the invention resides in the novel construction and arrangement of parts whereby displaceable draft members normally maintain a close-coupled connection between the tractor and trailer and are automatically displaced on the turning of the tractor out of alignment with the trailer to provide turning clearance therebetween.

In the drawing, Figure 1 is a side elevational part sectional view of a portion of a truck and trailer illustrating the present invention applied thereto.

Figure 2 is a plan view partly in section showing in full lines the arrangement of the coupling elements with the tractor and trailer in alignment and illustrating in dotted lines the disposition of the coupling elements when the tractor has assumed an angular position in turning.

Figures 3, 4 and 5 are miniature diagrammatic views showing the relationship of the coupling elements when the trailer is swung from its aligned position with the tractor to various angular positions.

It is highly desirable to enable the close-coupling of a tractor and trailer or semi-trailer, or the close-coupling of one trailer unit with another.

According to present methods of coupling however, a considerable space must be provided between the tractor cab and the semi-trailer or between one trailer and another in order to provide adequate clearance in turning so that the cab will clear the forward corners of the trailer.

It has been proposed to round the entire end of the trailer unit in order to enable the close-coupling of the same with the tractor and to provide for the turning, but such practice is objectionable since the carrying capacity of the trailer is materially reduced.

The present invention contemplates a marked improvement in effectively overcoming the above objections, and as a means of illustrating our invention we have shown the same associated with a semi-trailer 1 having a fifth wheel form of connection with the truck or tractor 2.

A plate 3 is here shown anchored in any suitable manner to the chassis 4 of the tractor and provided with upstanding bearing flanges or lugs 5 disposed in spaced relation at opposite sides of the chassis centre.

A plate or fifth wheel member 6 is provided on which the forward end of the semi-trailer is adapted to rest, the member 6 being here shown provided with downturned bearing flanges 7 which are pivotally connected with the upstanding flanges 5 of the trailer by means of the horizontal pivot bolts 8.

The trailer frame 9 is provided with a cross channel member 10 spaced rearwardly a suitable distance from the forward channel member 11 of the frame and a pair of angle guide bars 12 are supported in spaced parallel arrangement between the members 10 and 11 and extend in a fore and aft direction.

A bearing plate member 13 is rigidly secured to the underside of the frame members 10 and 11 and rests in turning bearing contact on the upper surface of the fifth wheel plate 6, the plate 13 being supported at its outer side edges by the frame members 14 extending between the members 10 and 11. The upper surface of the plate 13 is supported in spaced relation below the lower flanges of the angle guide bars 12.

Extending upwardly through the plate 13 between the guide bars 12 and adjacent the forward end thereof is a pivot bolt 15 and a link member 16 resting on the upper surface of the plate 13, is provided with a boss 17 through which the bolt 15 extends, the upper end of the bolt being firmly supported by a bracket member 18 secured to the forward member 11 of the trailer frame.

The plate 13 is slotted to register with the guide channel formed between the members 12, such slot being indicated by the numeral 19, and a pivot pin 20 extends upwardly through the fifth wheel bearing plate 6 adjacent the forward edge thereof through the slot 19 and connects the rearward end of the link 16 with the plate 6, forming a toggle or breaking joint.

The king bolt 21 extends upwardly through the fifth wheel plate 6, preferably in alignment with the horizontal pivot 8 and projects between the parallelly-spaced side flanges 22 of the members 12, and a roller member 23 rotatably encircles the king bolt pin 21 and is adapted to engage the upstanding guide flanges 22 in guiding thrust contact, a collar or flange member 24 being provided which extends over the upper edge of the guide flanges 22 to retain the members in position.

An arcuate slot 25 is shown formed in the plate 13 concentric with the pivot bolt 15 and intersecting the longitudinal slot 19 in order to provide for the swinging of the link member 16, as will hereinafter appear.

With the construction described it will be seen that when the tractor is in alignment with the trailer or directly forward thereof, the pivot pin 20 will be supported in aligned relation with the bolts 15 and 21 by reason of the connection of the fifth wheel plate member 6 with the plate 3 carried by the tractor chassis, and the traction effort will be transmitted from the tractor through the horizontal pivot pin 8, plate 6, pivot 20, link 16 and pivot bolt 15 to the frame of the trailer.

When the tractor is required to be turned or swung into angular relation to the trailer however, it will be seen that the plate 6 will be turned in unison with the tractor and in relation to the trailer, such turning being about the king pin 21, and since the link 16 is pivotally connected at its rearward end to the plate 6 by means of the pin 20 at a point forwardly of the king pin 21, the turning of the tractor in the manner defined will cause the link 16 to be swung on its pivot 15 to either one side or the other in accordance with the angular direction assumed by the tractor, thus breaking the toggle joint represented by the link 16 and plate 6.

The result of this displacement is to effect a shifting of the position of the load-transmitting pivot 20 forwardly as well as laterally, closer to the forward corner 26 or 27 of the trailer in accordance with the direction of turn, and since the said pivot 20 maintains a fixed distance from the rear wall 28 of the tractor cab, the forward end of the trailer will be bodily displaced with relation to the pivot 20 so that the corners 26 or 27 of the trailer will be automatically maintained a clearance distance from the wall 28 of the cab. Thus the greater the degree of turning of the tractor relative to the cab, the greater will be the swing of the link 16, and displacement of the pivot 20 relative to the trailer, and since the distance between the pivot bolts 15 and 21 will be shortened, due to the swinging of the plate 6 and link 16, the king pin bolt 21 with its friction-reducing roller 23 will be displaced longitudinally with relation to the trailer in guiding rolling thrust contact with the side walls 22 of the angle guide bars 12 while maintaining a position centrally of the width of the trailer.

With a compensating coupling such as described the trailer may be positioned with its forward end in close relation to the rearward wall 28 of the cab, and the desired clearance will automatically be provided and increased proportionately to the degree of turning of the tractor so that it is not necessary to round away the corners 26 or 27 to any great extent and the maximum width of trailer may be used.

It will be further evident that the close-coupling of the tractor cab and trailer body in this manner will eliminate a great amount of wind resistance, since the customary spacious recess provided rearwardly of the cab body will not be present, and access of head winds to the large frontal area of the trailer will be considerably reduced. The space ordinarily wasted between the cab and the trailer may thus be utilized to increase the load-carrying capacity of the transport and the importance of this will be evident since the over-all length of transports operating on public highways is limited to a certain maximum.

While the present invention defines, for purposes of illustration, a compensating coupling means interposed between a truck or tractor and a semi-trailer, it is to be understood that the invention is equally applicable to the close-coupling of two trailer units so that an extremely compact "train" transport will be provided.

What we claim as our invention is:—

1. The combination with a pair of transport units having the forward end of one resting on the other unit, of a draft connection between said units normally maintaining the same in close-coupled relation, said draft connection including a pair of break-joint toggle members relatively displaceable to provide a variable coupling distance between said close-coupled transport units, one of said toggle members being mounted on the frame of one of said units for rocking movement relative thereto about a horizontal axis and being constrained against rotation about a vertical axis relative to the said frame on which it is mounted to control the breaking of the toggle joint.

2. The combination with a pair of transport units to be close-coupled, of a bearing plate member pivotally supported on a horizontal pivot on one of said members and on which the other of said units is adapted to rest, means forming a displaceable turning connection between said last-mentioned transport unit and said plate, and link means pivotally connected with said plate in spaced relation to the turning connection and pivotally connected with said second-mentioned transport unit and adapted on the turning of one of said units relative to the other to swing the one unit clear of the other.

3. The combination with a tractor, of a fifth wheel plate mounted on the tractor to rock about a horizontal axis and having a king pin extending upwardly therefrom, guide means extending longitudinally of the trailer and forming a thrust guide for said king pin to permit movement thereof relative to the trailer, said trailer resting on said fifth wheel plate for turning movement about the king pin, a link having a fixed pivot at the forward end connecting the same with the forward end of the trailer, and a pivot connection between the rearward end of said link and the forward portion of said fifth wheel plate.

4. Means as claimed in claim 3 in which a bearing plate member is interposed between said link and said fifth wheel plate, said plate member being slotted to accommodate the king pin and having arcuate slots formed therein to accommodate the pivot connection between the link and fifth wheel plate.

5. A compensating draft connection for tractor and trailer units comprising a toggle device having one of the toggle members pivotally connected to the forward end of the trailer, the other toggle member being pivotally and slidably associated with the trailer and also having a horizontal rocking pivot connection with the tractor and being constrained to turn therewith to effect a positive breaking of said toggle device on the turning of the tractor relative to the trailer to provide definite turning clearance, said compensating draft connection being for the purpose of permitting the close coupling of the wheeled units.

6. A close-coupling compensating draft connection for wheeled vehicles of the overlapped tractor and trailer type comprising a pair of thrust pivots having a permanently fixed spaced relation on the centre line of one of said vehicles, said thrust pivots being respectively capable of longitudinal and transverse shifting in relation to the other vehicle, and guide means engaging said respective thrust members to control the clearance relation of the vehicles on turning, said guide means including a member mounted on the frame of the first-mentioned vehicle between the overlapping portions of the respective vehicles and having said thrust pivots mounted thereon.

7. Means as claimed in claim 6 in which said last-mentioned member comprises a turning plate horizontally pivoted on the first-mentioned vehicle and having pivotal action about the longitudinally shiftable thrust pivot to effect the transverse shifting of the other thrust pivot, said longitudinally shiftable thrust pivot comprising a king pin.

WILLIAM S. GURTON.
JOSEPH PLINT.
HERMAN NYBERG.